United States Patent [19]
Kuipers

[11] Patent Number: 5,890,606
[45] Date of Patent: Apr. 6, 1999

[54] BATTERY RACK HAVING LOW RESISTANCE COMPARTMENT DIVIDERS AND METHODS OF OPERATION AND MANUFACTURE THEREOF

[75] Inventor: Roy Kuipers, Rockwall, Tex.

[73] Assignee: Lucent Technologies Inc., Murray Hill, N.J.

[21] Appl. No.: 890,898

[22] Filed: Jul. 10, 1997

[51] Int. Cl.[6] .................................................... A47F 7/00
[52] U.S. Cl. ............................................................ 211/186
[58] Field of Search ................................. 211/186, 184; 108/60, 61

[56] References Cited

U.S. PATENT DOCUMENTS

| | | | |
|---|---|---|---|
| 4,795,042 | 1/1989 | Klein et al. | 211/186 |
| 4,949,853 | 8/1990 | Klein et al. | 211/186 |

Primary Examiner—Alvin Chin-Shue
Assistant Examiner—Sarah Purol

[57] ABSTRACT

A battery rack for containing batteries and methods of operation and manufacture thereof. In one embodiment, the battery rack includes: (1) a plurality of shelf support members, (2) first and second shelves, coupled to the shelf support members to receive support therefrom, the first and second shelves having corresponding first and second pluralities of divider apertures therethrough, the first plurality of divider apertures substantially vertically-aligned with the second plurality of divider apertures and (3) a plurality of divider rods passing through corresponding vertically-aligned ones of the first and second pluralities of divider apertures to form dividers to divide the battery rack into battery compartments, the plurality of divider rods having a diameter less than that of the first and second pluralities of divider apertures to allow the plurality of divider rods to rotate and thereby present a low frictional resistance to movement of batteries within the battery compartments.

20 Claims, 3 Drawing Sheets

BATTERY RACK HAVING LOW RESISTANCE COMPARTMENT DIVIDERS AND METHODS OF OPERATION AND MANUFACTURE THEREOF

TECHNICAL FIELD OF THE INVENTION

The present invention is directed, in general, to battery racks and, more specifically, to a compartmented battery rack having low resistance dividers between the compartments thereof and methods of operation and manufacture of the battery rack.

BACKGROUND OF THE INVENTION

A battery rack is a structure for holding many individual batteries such that the batteries may be electrically-coupled to provide a power source for electronic systems. Battery power sources are frequently used, particularly in telecommunications applications, to provide a source of back-up power in the event of a loss of commercial power. The batteries, which should have the same nominal voltage rating, are coupled in parallel such that the total power capacity of the combination of batteries is equal to the sum of the amperage capacities of all of the batteries. For a given application, the minimum number of batteries required is thus a function of the amperage requirement of the system for which back-up power is to be provided.

The shelves in a conventional battery rack are vertically-spaced to accommodate the height of the batteries to be placed therein. Additional vertical space may be required if the battery terminals are located on top of the batteries, the additional space allowing for isolation between the terminals and the next-upper shelf as well as tool clearance for coupling/decoupling the batteries. Battery racks should also include a means for maintaining proper spacing between adjacent batteries.

The spacing between adjacent batteries when placed into a battery rack is crucial to the "health," or life-expectancy, of the batteries. During charging and discharging, the batteries generate heat which, if not dissipated, degrades battery performance and life-expectancy; proper spacing between batteries promotes cooling, thereby enhancing battery performance and life-expectancy. Conventional battery racks have employed locking or locating devices, such as brackets, to maintain proper spacing between adjacent batteries. Such conventional locating devices must be individually-secured to each battery-rack shelf, which typically requires the use of other mechanical means to secure the devices to the shelves. In a battery rack designed to accommodate many batteries, such locating devices must be coupled to each shelf between every battery location, thus requiring many parts and much labor.

During the installation, maintenance and servicing of battery power plants, batteries must be inserted and extracted from the battery rack. Because the batteries are typically quite heavy, it is important that the structure of the battery rack not impede or frustrate the insertion and extraction of batteries therefrom. Conventional locating devices, secured to each battery shelf to maintain proper spacing between adjacent batteries, are stationary devices. The stationary locating devices present a source of friction to a battery casing as a battery is inserted or extracted from the battery rack, thus impeding the insertion and removal of batteries from the battery rack. In addition, the non-movable locating devices may cause damage to a battery casing as the battery is inserted or extracted; if the casing is ruptured, caustic liquids may be released which can cause damage to the battery rack and other batteries, and which may cause injury to persons servicing the battery plant.

Accordingly, what is needed in the art is a battery rack employing locating devices, between the battery compartments thereof, which minimize the number of mechanical parts and labor required for installation thereof, and which do not present a significant source of friction to, or interference with, a battery casing during the insertion or extraction of a battery into or from the battery rack.

SUMMARY OF THE INVENTION

To address the above-described deficiencies of the prior art, the present invention provides a battery rack for containing batteries and methods of operation and manufacture thereof. In one embodiment, the battery rack includes: (1) a plurality of shelf support members, (2) first and second shelves, coupled to the shelf support members to receive support therefrom, the first and second shelves having corresponding first and second pluralities of divider apertures therethrough, the first plurality of divider apertures substantially vertically-aligned with the second plurality of divider apertures and (3) a plurality of divider rods passing through corresponding vertically-aligned ones of the first and second pluralities of divider apertures to form dividers to divide the battery rack into battery compartments, the plurality of divider rods having a diameter less than that of the first and second pluralities of divider apertures to allow the plurality of divider rods to rotate and thereby present a low frictional resistance to movement of batteries within the battery compartments.

The present invention therefore replaces conventional, higher-friction dividers with rotatable divider rods. Because they rotate when a battery being inserted into or removed from the battery rack comes into contact with them, they present a lower frictional resistance to the battery, thereby rendering the insertion or removal easier.

In one embodiment of the present invention, the battery rack further comprises a third shelf, coupled to the plurality of shelf support members and having a third plurality of divider apertures therethrough, the third plurality of divider apertures vertically- misaligned with respect to the first and second pluralities of apertures to capture the plurality of divider rods in the battery rack. In an embodiment to be illustrated and described, the third plurality of divider apertures are slightly offset, such that the plurality of divider rods must bend slightly as they are passed through the first, second and third pluralities of apertures; the divider rods are sufficiently short to allow them to pass completely through the third plurality of apertures, spring straight and be captured within the battery rack.

In one embodiment of the present invention, each of the dividers comprises two of the plurality of divider rods. The divider rods may be arranged in a straight line or may be offset to prevent the batteries on both sides of a single divider rod from contacting the same and thereby reducing its ability to rotate.

In one embodiment of the present invention, the first and second pluralities of divider apertures are free of sleeve bearings for the plurality of divider rods. Alternatively, the divider apertures, the divider rods or both may be provided with such sleeves, shoulders or the like that may be desirable in a given application to lend vertical or horizontal support to the divider rods.

In one embodiment of the present invention, the battery rack further comprises first and second battery covers, coupled to the battery rack for rotation relative thereto, the first and second battery covers rotatable toward a closed position to cover batteries in the battery rack. In the embodiment to be illustrated and described, the battery covers shield the batteries from frontside exposure.

In one embodiment of the present invention, the plurality of divider rods consist of resilient metal rods. Alternatively, the divider rods may comprise metal or plastic sleeves that run along all or only part of the length of the divider rods to further to decrease the frictional resistance of the divider rods as a whole.

In one embodiment of the present invention, the shelf support members include four vertical members, each of the four vertical members being coupled proximate to corresponding corners of each of the shelves. Alternatively, one shelf support member may be employed at either end of the shelves; i.e., a shelf support member may form a sidewall of the battery rack; those skilled in the art will readily perceive of other equivalent structures for providing support to the shelves, such equivalent structures being within the scope of the invention as claimed hereinafter.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
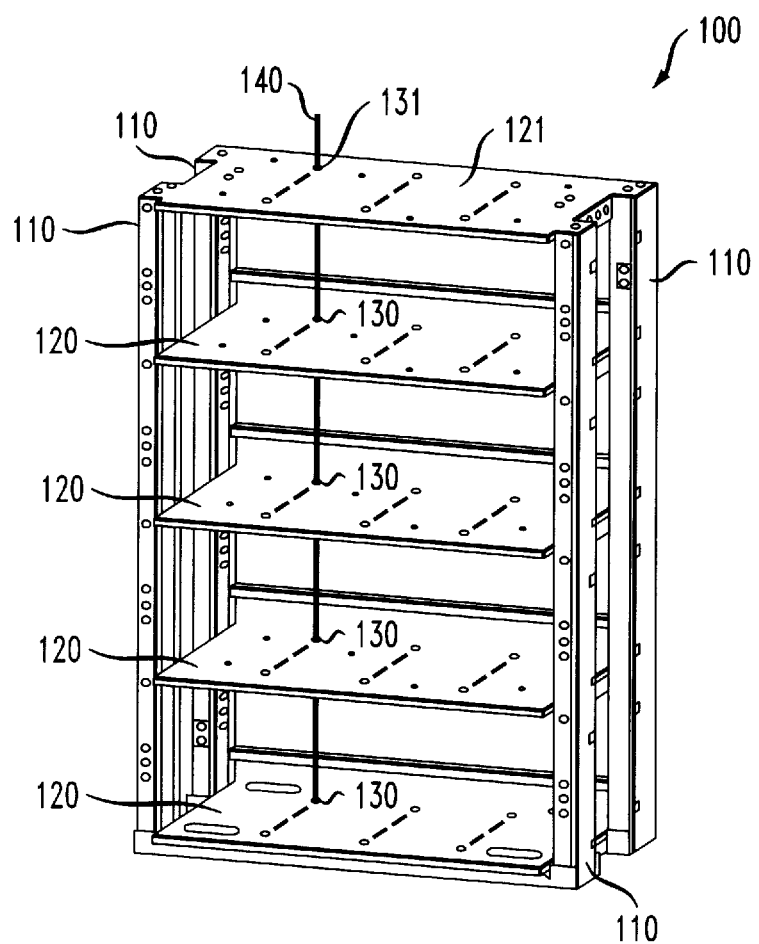
FIG. 1 illustrates an isometric view of an exemplary battery rack employing a rotatable battery compartment divider rod according to the principles of the present invention.

Referring initially to FIG. 1, illustrated is an isometric view of an exemplary battery rack 100. The battery rack 100 includes shelf support members, generally designated as 110, and shelves, generally designated as 120. In the embodiment illustrated, four shelf support members 110 are employed, one at each corner of shelves 120. Alternatively, one shelf support member may be employed at either end of shelves 120; i.e., a shelf support member may form a sidewall of the battery rack 100; those skilled in the art will readily perceive of equivalent structures for providing support to shelves 120, such equivalent structures being within the scope of the invention as claimed hereinafter.

The shelves 120 are coupled to the shelf support members 110 to receive support therefrom. If the shelf support members 110 and the shelves 120 are both formed of metal, the shelves 120 may be welded to the shelf support members 110. Alternatively, the shelves 120 may be fastened to the shelf support members by mechanical coupling means, such as bolts or rivets, or corresponding interlocking means, such as dovetail fittings, provided on each shelf and shelf support member; those skilled in the art will readily perceive of equivalent structures for coupling shelves 120 to shelf support members 110, such equivalent structures being within the scope of the invention as claimed hereinafter.

The shelves 120 include divider apertures, generally designated as 130, for receiving divider rods (one shown), generally designated as 140, therethrough. The divider apertures 130 in each of the shelves 120 are substantially vertically-aligned with the divider apertures 130 in each of the other shelves 120 such that a divider rod 140 may be passed, without significant bending thereof, through corresponding ones of the substantially vertically-aligned divider apertures 130. Each divider aperture 130 in the lowermost shelf 120 may include a retaining means, such as a cup, that receives an end of the divider rod 140.

The divider apertures 130 in each of the shelves 120 are preferably arranged such that divider rods 140 may be positioned therethrough to form dividers to divide the battery rack 100 into battery compartments; in one embodiment, each battery compartment divider includes two divider rods 140. The divider rods 140 preferably have a diameter less than that of the divider apertures 130 to thereby allow the divider rods 140 to rotate freely within the apertures; the use of divider rods 140 having a diameter less than that of the divider apertures 130 has the advantage that the divider apertures 130, or the divider rods 140, do not require sleeve bearings between the rods and apertures. Alternatively, or in addition to the divider rods 140 having a diameter less than that of the divider apertures 130, the apertures or rods may include sleeve bearings (not shown) which allow the rods to rotate within the apertures; those skilled in the art will readily perceive of equivalent structures which allow the divider rods 140 to freely rotate within the divider apertures 130, such equivalent structures being within the scope of the invention as claimed hereinafter.

In contrast to the fixed divider means, or locating devices, employed in conventional battery racks, the rotatable divider rods disclosed by the present invention present a low frictional resistance to movement of batteries within the battery compartments, thereby easing the insertion and extraction of batteries into and from the battery rack. Furthermore, the divider rods 140 are easily inserted through, and retained by, the divider apertures 130, thereby minimizing the number of mechanical parts and labor required for installation thereof.

In one embodiment, the battery rack 100 also includes a shelf 121, also coupled to the shelf support members 110, which includes divider apertures, generally designated as 131, therethrough. In this embodiment, the divider apertures 131 are vertically-misaligned with respect to the divider apertures 130 in the shelves 120. In this embodiment, the divider rods 140 are preferably formed of a resilient material, which may be metal, such that the divider rods 140 may be flexed during insertion through the divider apertures 131 and divider apertures 130; i.e., the divider apertures 131 are vertically-misaligned with the divider apertures 130 and, thus, the divider rods 140 must temporarily deform to pass therethrough. In addition, the length of each divider rod 140 should be selected such that, upon passing through the divider apertures 131 and 130, the end of the divider rod is allowed to pass completely through the divider aperture 131, whereupon the resilient divider rod 140 will return to its originally shape. Because the divider apertures 131 are vertically-misaligned with the divider apertures 130, the end of divider rod 140 will become misaligned with the divider aperture 131 such that the rod is captured by the shelf 121. Thus, in contrast to the fixed divider means, or locating devices, employed in conventional battery racks, this embodiment does not require any mechanical parts, or significant labor, to couple the divider means to the battery rack 100, thereby significantly reducing the cost of manufacturing such battery racks.

Figure 2:
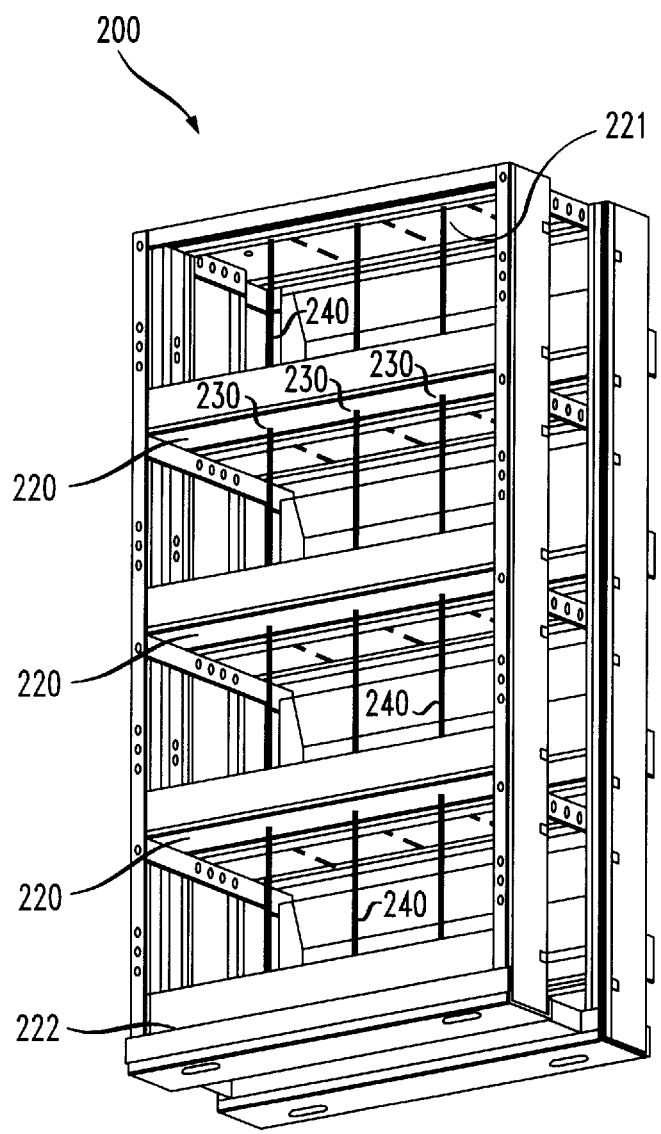
FIG. 2 illustrates a rear isometric view of an exemplary battery rack.

Turning now to FIG. 2, illustrated is a rear isometric view of an exemplary battery rack 200. The battery rack 200 includes shelf support members 210, intermediate shelves 220, top shelf 221 and bottom shelf 222, which may be constructed as described with reference to exemplary battery rack 100 of FIG. 1. The intermediate shelves 220 include vertically-aligned divider rod apertures 230; the top shelf 221 includes divider rod apertures (not visible) which are vertically-misaligned with the divider rod apertures 230 in the intermediate shelves 220. The battery rack 200 further includes divider rods 240 which are preferably formed of a resilient material such that the divider rods 240 may be flexed during insertion through the divider apertures in the top shelf 221 and divider apertures 230 in the intermediate shelves 220, such that the divider rods 240 are captured by the top shelf 221 after the upper ends thereof pass through the divider rod apertures in the top shelf. If desired, a retaining means (not shown) may be provided on the underside of the top shelf 221 to restrict lateral displacement of the divider rods 240; e.g., the upper ends of each divider rod 240 may be captured in a channel, after passing through the top shelf 221, such that batteries placed in the rack may not shift laterally.

It is not necessary that the bottom shelf 222 include divider rod apertures; i.e., the lower end of the divider rods 240 may rest on the upper surface of bottom shelf 222. Alternatively, bottom shelf 222 may include divider rod apertures vertically-aligned with the divider rod apertures 230 in the intermediate shelves 220, in which case the bottom shelf 222 may include retaining means, such as a cup (not shown) formed beneath each divider rod aperture, that receive and retain the lower ends of the divider rods 240; those skilled in the art will readily perceive of equivalent structures for receiving and retaining the lower ends of divider rods 240, such equivalent structures being within the scope of the invention as claimed hereinafter.

Figure 3:
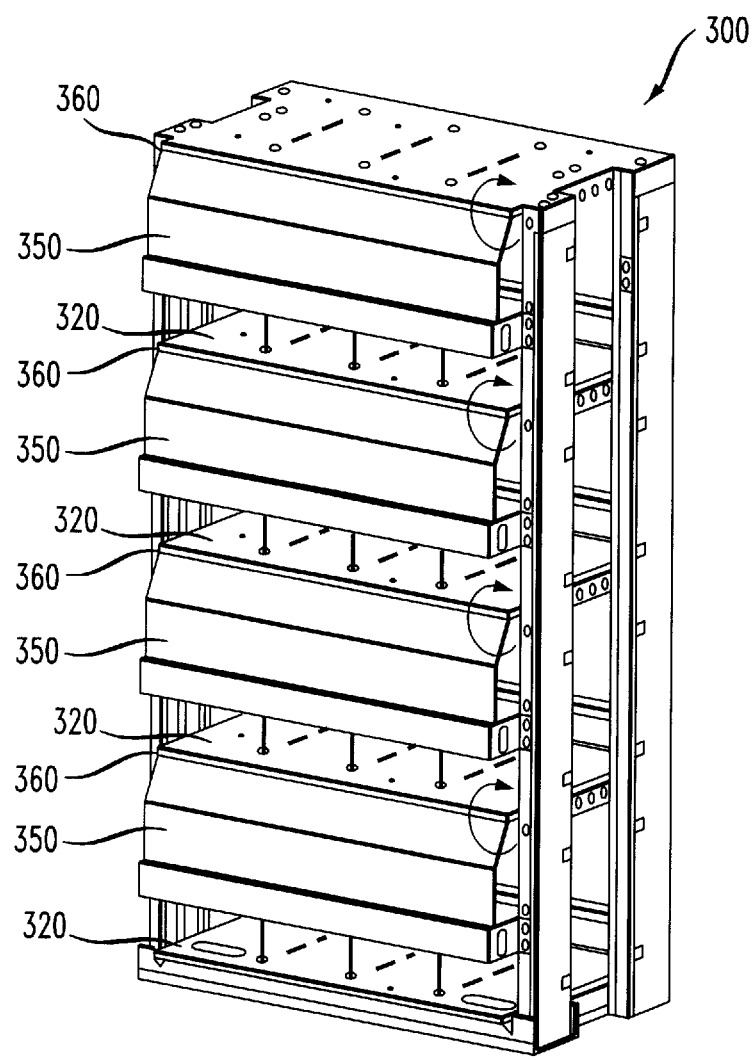
FIG. 3 illustrates a front isometric view of an exemplary battery rack including battery covers.

Turning now to FIG. 3, illustrated is a front isometric view of an exemplary battery rack 300 including battery covers 350. The battery rack 300 has a structure generally conforming to the structure of exemplary battery racks 100 and 200 described hereinabove. Exemplary battery rack 300, however, further includes battery covers 350 for each battery shelf 320. The battery covers 350 may include a hinge 360 along an upper edge thereof, which allows each cover to rotate between an open and a closed position (shown); alternatively, or in addition to being hingedly-coupled to the battery rack 300, the battery covers 350 may be removably-coupled thereto. The battery covers 350 may be rotated to an open position, or removed, for the insertion or extraction of a battery into or from the battery rack 300. The use of battery covers 350 is not required, but has the advantage of protecting the batteries as well as persons who might otherwise inadvertently come in contact with the electrical terminals of batteries placed in the battery rack.

Although the present invention has been described in detail, those skilled in the art should understand that they can make various changes, substitutions and alterations herein without departing from the spirit and scope of the invention in its broadest form.

What is claimed is:

1. A battery rack for containing batteries, comprising:

a plurality of shelf support members;

first and second shelves, coupled to said shelf support members to receive support therefrom, said first and second shelves having corresponding first and second pluralities of divider apertures therethrough, said first plurality of divider apertures substantially vertically-aligned with said second plurality of divider apertures; and a plurality of divider rods passing through corresponding vertically-aligned ones of said first and second pluralities of divider apertures to form dividers to divide said battery rack into battery compartments, said plurality of divider rods having a diameter less than that of said first and second pluralities of divider apertures to allow said plurality of divider rods to rotate and thereby present a low frictional resistance to movement of batteries within said battery compartments.

2. The battery rack as recited in claim 1 further comprising a third shelf, coupled to said plurality of shelf support members and having a third plurality of divider apertures therethrough, said third plurality of divider apertures vertically misaligned with respect to said first and second pluralities of apertures to capture said plurality of divider rods in said battery rack.

3. The battery rack as recited in claim 1 wherein each of said dividers comprises two of said plurality of divider rods.

4. The battery rack as recited in claim 1 wherein said first and second pluralities of divider apertures are free of sleeve bearings for said plurality of divider rods.

5. The battery rack as recited in claim 1 further comprising first and second battery covers, coupled to said battery rack for rotation relative thereto, said first and second battery covers rotatable toward a closed position to cover batteries in said battery rack.

6. The battery rack as recited in claim 1 wherein said plurality of divider rods consist of resilient metal rods.

7. The battery rack as recited in claim 1 wherein said plurality of shelf support members comprises four vertical members, each of said four vertical members coupled proximate to corresponding corners of each of said shelves.

8. A method of manufacturing a battery rack for containing batteries, comprising the steps of:

forming a plurality of shelf support members;

coupling first and second shelves to said shelf support members to receive support therefrom;

creating corresponding first and second pluralities of divider apertures in said first and second shelves, said first plurality of divider apertures substantially vertically-aligned with said second plurality of divider apertures; and passing a plurality of divider rods through corresponding vertically-aligned ones of said first and second pluralities of divider apertures to form dividers to divide said battery rack into battery compartments, said plurality of divider rods having a diameter less than that of said first and second pluralities of divider apertures to allow said plurality of divider rods to rotate and thereby present a low frictional resistance to movement of batteries within said battery compartments.

9. The method as recited in claim 8 further comprising the steps of:

coupling a third shelf to said plurality of shelf support members; and creating a third plurality of divider apertures in said third shelf, said third plurality of divider apertures vertically-misaligned with respect to said first and second pluralities of apertures to capture said plurality of divider rods in said battery rack.

10. The method as recited in claim 8 wherein each of said dividers comprises two of said plurality of divider rods.

11. The method as recited in claim 8 wherein said first and second pluralities of divider apertures are free of sleeve bearings for said plurality of divider rods.

12. The method as recited in claim 8 further comprising the step of coupling first and second battery covers to said battery rack for rotation relative thereto, said first and second battery covers rotatable toward a closed position to cover batteries in said battery rack.

13. The method as recited in claim 8 wherein said plurality of divider rods consist of resilient metal rods.

14. The method as recited in claim 8 wherein said plurality of shelf support members comprises four vertical members, each of said four vertical members coupled proximate to corresponding corners of each of said shelves.

15. A method of operating a battery rack for containing batteries, comprising the steps of:

vertically orienting a plurality of shelf support members to stand said battery rack upright, first and second shelves of said battery rack being supported by said plurality of shelf support members, a plurality of divider rods passing through corresponding vertically-aligned ones of first and second pluralities of divider apertures in said first and second shelves to form dividers to divide said battery rack into battery compartments, said plurality of divider rods having a diameter less than that of said first and second pluralities of divider apertures to allow said plurality of divider rods to rotate and thereby present a low frictional resistance to movement of batteries within said battery compartments; and inserting a plurality of batteries into said battery compartments of said battery rack.

16. The method as recited in claim 15 wherein said battery rack further comprises a third shelf, coupled to said plurality of shelf support members and having a third plurality of divider apertures therethrough, said third plurality of divider apertures vertically- misaligned with respect to said first and second pluralities of apertures to capture said plurality of divider rods in said battery rack.

17. The method as recited in claim 15 wherein each of said dividers comprises two of said plurality of divider rods.

18. The method as recited in claim 15 wherein said first and second pluralities of divider apertures are free of sleeve bearings for said plurality of divider rods.

19. The method as recited in claim 15 further comprising the step of rotating first and second battery covers of said battery rack toward a closed position to cover batteries in said battery rack.

20. The method as recited in claim 15 wherein said plurality of divider rods consist of resilient metal rods.

\* \* \* \* \*